May 19, 1959 — O. L. SCHODORF, SR — 2,887,231
CLAMPING BRACKET FOR PLATE GLASS
Filed Dec. 4, 1956 — 2 Sheets-Sheet 1

INVENTOR.
OTTO L. SCHODORF, SR.
BY CORBETT, MAHONEY & MILLER
ATTYS.

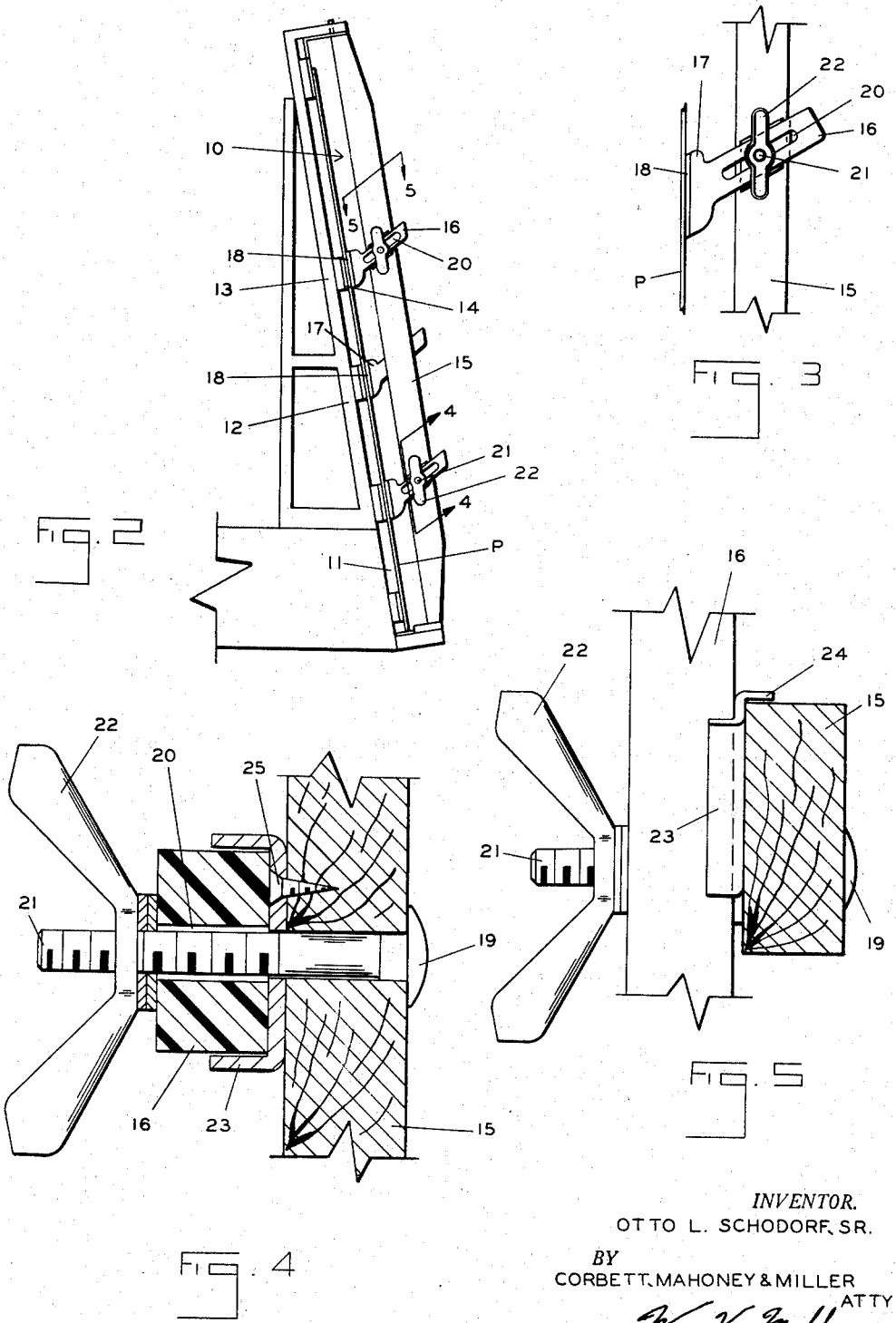

United States Patent Office 2,887,231
Patented May 19, 1959

2,887,231

CLAMPING BRACKET FOR PLATE GLASS

Otto L. Schodorf, Sr., Columbus, Ohio, assignor to Schodorf Truck Body & Equipment Co., Columbus, Ohio, a corporation of Ohio Application December 4, 1956, Serial No. 626,142

3 Claims. (Cl. 211—41)

This invention relates to a clamping bracket for plate glass. It has to do, more particularly, with a clamping bracket which is adapted to be associated with a rack for holding plate glass to maintain the plate glass in position in the rack and to prevent vibration thereof in the rack which might break the glass. It is especially applicable to plate glass racks which are used on trucks for transporting the plate glass although it is not limited thereto.

According to this invention, there is provided, in association with the plate glass rack, a series of clamping brackets formed in accordance with this invention. Plate glass racks usually include a back which is slightly inclined from the vertical and against which the plate glass, supported on edge, will lean. The back of the rack is usually padded in some manner and it is important to hold the plate glass firmly against the padded back. This is accomplished with clamping brackets which are supported on removable substantially vertical rails or posts which are disposed at the front of the rack outside the glass. According to this invention, the clamping brackets are provided with padded forward ends and are adjustably mounted on the vertical rails or posts. Moreover, the adjustable connections between the vertical rails and the brackets are such that the glass-engaging padded end of each bracket is always parallel to the outer face of the glass so that the padded end of the bracket will always properly engage the plate glass and will not create any undesirable stresses therein which might tend to cause breakage.

The accompanying drawings illustrate the adjustable clamping brackets associated with a glass rack in accordance with this invention.

In the drawings:

Figure 2 is a side elevational view of the rack with a plurality of the brackets thereon.

Figure 3 is a detail in side elevation showing an adjustable bracket mounted on a supporting rail and engaging a sheet of plate glass carried by the rack.

Figure 4 is an enlarged transverse vertical sectional view through the bracket taken along line 4—4 of Figure 2.

Figure 5 is an enlarged horizontal sectional view taken along line 5—5 of Figure 2.

Figure 1:
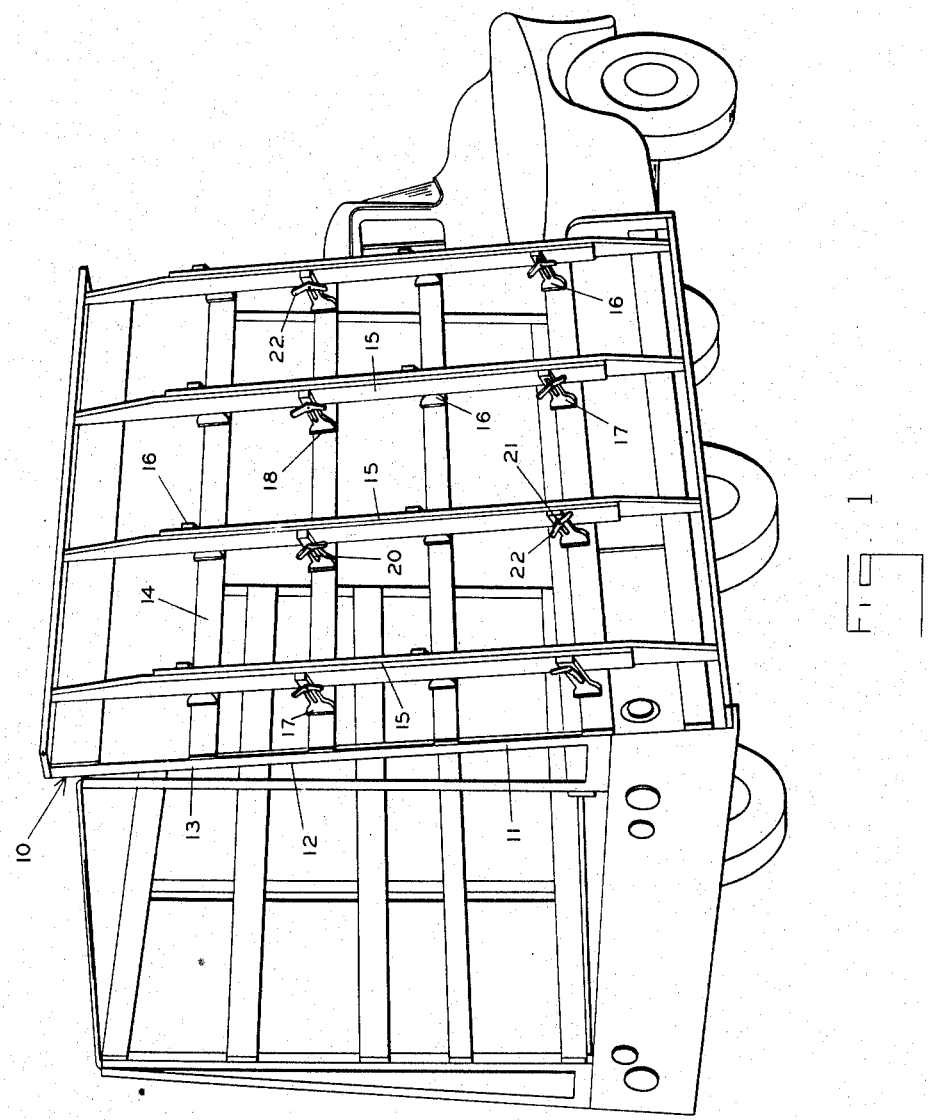
Figure 1 is a perspective view showing a number of the brackets associated with a plate glass rack provided on a truck.

With reference to the drawings, in Figure 1 there is illustrated a rack 10 carried on a truck body. The rack 10 itself is of usual construction embodying a back 11 which is inclined inwardly slightly from the vertical and which comprises vertical supports 12 that carry vertically spaced horizontally extending slats 13. These slats 13 are provided with padded outer surfaces 14, preferably of soft plastic, against which the plate of glass, indicated by the letter P, leans. Spaced outwardly from the back 11, removable substantially vertically disposed laterally spaced rails 15 are provided, these rails being suitably mounted on the rack, as indicated. For holding the glass plate P firmly against the back 11 when it is supported in the rack and leans against the back, a plurality of adjustable clamping brackets 16 are provided and these brackets are carried by the removable rails 15.

According to this invention, each of the brackets 16 is preferably formed as a single unit of rigid plastic material. The forward end of this bracket 16 has a shoe 17 (Figures 2 and 3) formed thereon and this shoe has a padded glass contacting forward surface 18 which is preferably of soft plastic. This forward pad surface 18 is at an angle relative to the longitudinal center line of the bracket 16 so that the bracket 16 can be supported in sharply downwardly inclined position with the pad surface 18 in proper position to engage the plate glass.

Each bracket 16 is mounted on an associated rail 15 by a special type of connection which will prevent flop-over of the bracket and will keep the glass-engaging pad surface 18 always parallel to the plane of the back 11 and, therefore, to the surface of the glass plate P supported on edge by the rack. Thus, during adjustment of the pad surface 18 towards and away from the plate glass P, it will be parallel therewith and when it contacts with the glass plate, it will firmly contact the surface of the glass throughout the area of the pad surface 18.

The adjustable connection between each clamping bracket 16 and its associated rail 15 is illustrated best in Figures 2 to 5. It will be noted that the body of the bracket 16 has a longitudinal slot 20 extending therethrough from side-to-side and extending substantially the complete length thereof. This slot is adapted to receive a clamping bolt 21 which is passed transversely through the rail 15 at the desired vertical position and is provided with a stop head 19 which engages the rail. The bolt is provided with a clamping wing-nut 22 on its threaded opposite end which is adapted to engage the clamping member 16. To prevent flop-over or vertical pivoting of the member 16 about the bolt 21, a guide channel 23 is provided. This guide channel 23 is of proper size to snugly receive the member 16 so that it can slide back and forth therein, without vertical swinging, towards the back 11 of the rack and the glass plate P supported thereby. The guide channel 23 is positioned at a proper angle so that the pad face 18 will be parallel with the plane of the back 11 of the rack and, therefore, with the glass plate P carried thereby. It will be apparent that the bolt 21 also extends through an aligning opening in the channel 23. The guide channel 23 is maintained in position on the post at the proper angle by means of a vertical flange 24 which is provided at the outer edge thereof and which engages the forward edge of the rail 15. This flange 24 is parallel to the pad surface 18 and, consequently, the channel 23 is so positioned that the member 16 will tend to feed by gravity downwardly and towards the plate glass P. The guide channel 23 may be fastened to the rail 15 by means of screws 25 passing through openings in the body thereof and into the associated rail 15.

Thus, it will be apparent that the member 16 may be adjusted in and out on the rail 15 relative to the back 11 of the rack, being guided by the channel 23 and being prevented from swinging vertically about the bolt 21. It will be apparent that for this reason the cross-section of the member 16 is square and cooperates with the channel 23 to permit sliding movement only. It is merely necessary to release the wing-nut 22 to permit this sliding adjustment in the channel 23, gravity tending to move the member 16 towards the glass, and when the adjustment is finally completed, to tighten the wing-out to clamp the member 16 in adjusted position in the channel 23. During this adjustment, the pad surface 18 is moved back and forth relative to the plate glass P but is always parallel thereto. When the surface 18 contacts the glass P it will contact firmly with the outer surface of the glass throughout the area of the pad. Thus, there will be no undue stresses set up in the glass plate P by the clamping members 16, and the glass plate will be held firmly against the back 11 of the rack so that breakage will not occur during transportation.

It will be noted from Figure 1 that the clamping members 16 may be disposed on either side of each rail 15. For this purpose it is desirable to provide right-hand and left-hand channel guides 23.

It will be apparent from the above description that this invention has many advantages and that some of these important advantages have been discussed but others will be apparent.

Having thus described this invention, what is claimed is:

1. In combination, an upright rack for supporting plate glass, said rack comprising a back against which the plate of glass supported on edge is adapted to bear and having means against which said edge rests, supported rails disposed in spaced relationship to the back of the rack in front thereof, glass-clamping means mounted on said rails for holding the glass plate against the back of the rack, said clamping means comprising clamping members mounted on the rails for movement toward and from the back of the rack and the plate glass supported thereby, said clamping members having glass-engaging shoes on their forward ends, and means for maintaining said shoes parallel with the back of the glass rack and the surface of a glass plate supported thereby as indicated, said means comprising an interfitting guide structure between each of said clamping members and the rail upon which it is mounted for permitting straight-line longitudinal movement of the clamping member towards and from the back of the rack and the glass supported thereby but for preventing vertical swinging movement of said member, said guide structure for each clamping member being directed downwardly and rearwardly toward said back of the rack and the plate of glass supported thereby so that when the clamping means is released, the clamping member will automatically feed by gravity toward said back and the plate of glass supported thereby.

2. The combination of claim 1 in which the back of the rack is angled inwardly so that the plate of glass supported on edge will tend to lean inwardly against the back of the rack, each of said clamping members being elongated with said glass-engaging shoe on its forward end at an angle to the center line of said member, each of said clamping members having a slot extending longitudinally along the center line thereof, said guide structure comprising a guide channel for each clamping member fixed to the associated rail and inclined downwardly and rearwardly relative to the rail for slidably receiving and guiding said clamping member toward and from the back of the rack and the glass supported thereby, and a clamping bolt in said guide channel and extending outwardly through the slot in the clamping member disposed therein.

3. The combination of claim 2 in which each guide channel member carries a vertical flange which engages the associated supporting rail and which will be parallel to the glass-engaging surface of the shoe of the clamping member when the clamping member is positioned in said channel.

References Cited in the file of this patent

UNITED STATES PATENTS

| | | |
|---|---|---|
| 736,416 | Medina | Aug. 18, 1903 |
| 1,543,170 | Long | June 23, 1925 |
| 2,100,971 | McDonald | Nov. 30, 1937 |
| 2,518,624 | Kraft | Aug. 15, 1950 |

FOREIGN PATENTS

| | | |
|---|---|---|
| 1,367 | Great Britain | of 1900 |

UNITED STATES PATENT OFFICE
CERTIFICATE OF CORRECTION

Patent No. 2,887,231

May 19, 1959

Otto L. Schodorf, Sr.

It is hereby certified that error appears in the printed specification of the above numbered patent requiring correction and that the said Letters Patent should read as corrected below.

Column 3, lines 19 and 20, for "supported rails" read -- supporting rails --.

Signed and sealed this 10th day of November 1959.

(SEAL)
Attest:

KARL H. AXLINE
Attesting Officer

ROBERT C. WATSON
Commissioner of Patents